(12) United States Patent
Emura et al.

(10) Patent No.: US 9,896,157 B2
(45) Date of Patent: Feb. 20, 2018

(54) MOUNTING DEVICE FOR BICYCLE FRONT DERAILLEUR

(71) Applicant: Shimano Inc., Sakai, Osaka (JP)

(72) Inventors: Atsuhiro Emura, Sakai (JP); Kazuya Kuwayama, Sakai (JP)

(73) Assignee: SHIMANO INC., Sakai, Osaka (JP)

( * ) Notice: Subject to any disclaimer, the term of this patent is extended or adjusted under 35 U.S.C. 154(b) by 509 days.

(21) Appl. No.: 14/066,489

(22) Filed: Oct. 29, 2013

(65) Prior Publication Data

US 2015/0115568 A1   Apr. 30, 2015

(51) Int. Cl.
*B62M 9/135* (2010.01)

(52) U.S. Cl.
CPC .................... *B62M 9/135* (2013.01)

(58) Field of Classification Search
CPC ...................................... B62M 9/135
USPC .......................................... 280/261
See application file for complete search history.

(56) References Cited

U.S. PATENT DOCUMENTS

| 6,612,950 | B2 * | 9/2003 | Nanko .......................... 474/82 |
| 7,867,118 | B2 * | 1/2011 | Yamamoto et al. ............ 474/80 |
| 8,235,849 | B2 * | 8/2012 | Cranston et al. ............. 474/144 |
| 2013/0029795 | A1 | 1/2013 | Jordan et al. |

\* cited by examiner

*Primary Examiner* — Joseph M Rocca
*Assistant Examiner* — Felicia L. Brittman
(74) *Attorney, Agent, or Firm* — Jeffer Mangels Butler & Mitchell LLP; Brennan C. Swain, Esq.

(57) ABSTRACT

A mounting device for mounting a front derailleur to a bicycle frame. The mounting device includes a mounting portion that is adapted to be adjustably mounted such that it is positioned around an axis that is defined by a bottom bracket of the bicycle frame, and an indicator configured to indicate an orientation of the mounting portion relative to a predetermined direction.

15 Claims, 9 Drawing Sheets

MOUNTING DEVICE FOR BICYCLE FRONT DERAILLEUR

FIELD OF THE INVENTION

The present invention relates to a mounting device for a bicycle front derailleur.

BACKGROUND OF THE INVENTION

Bicycle front derailleurs are well known in the art and typically include a chain guide that moves the chain from one chain ring (sprocket) to another chain ring in response to the rider's operation. For example, see U.S. Patent No. 2013/0029795 to Jordan, the entirety of which is incorporated herein by reference. When mounting the front derailleur to a bicycle frame, there is typically an optimal position for the derailleur so that it can efficiently move the chain from one ring to another. The optimal position is based on the direction that the chain extends or runs when engaged with a chain ring. This predetermined optimal position may be known by the manufacturer, but a user may have a difficult time knowing this optimal position. Accordingly, there exists a need for helping a user determine the preferably position of a front derailleur with respect to the chain and it's running direction.

SUMMARY OF THE PREFERRED EMBODIMENTS

In accordance with a first aspect of the present invention there is provided a mounting device for mounting a front derailleur to a bicycle frame. The mounting device includes a mounting portion that is adapted to be adjustably mounted such that it is positioned around an axis that is defined by a bottom bracket of the bicycle frame, and an indicator configured to indicate an orientation of the mounting portion relative to a predetermined direction. In a preferred embodiment, the predetermined direction corresponds to a chain line which is defined by a running direction of a bicycle chain. The indicator is configured to indicate a circumferential position of the mounting portion around the axis of the bottom bracket. Preferably, the indicator comprises a directional mark which is configured to be parallel to the predetermined direction and the chain line is defined by the running direction of the bicycle chain when the bicycle chain is engaged with a chain ring.

In a preferred embodiment, the indicator includes at least first and second indicators that are positioned such that when the mounting device is adjustably mounted around the axis of the bottom bracket the first indicator will indicate an orientation of the mounting portion relative to a first direction corresponding to a first chain line defined by a first chain ring and the second indicator will indicate an orientation of the mounting portion relative to a second direction corresponding to a second chain line defined by a second chain ring. Preferably, the mounting portion has at least one slot extending in a circumferential direction about the axis of the bottom bracket. In an embodiment, the mounting part includes a central opening defined therein that is axially aligned with the axis of the bottom bracket when the mounting part is mounted around the axis of the bottom bracket, and the mounting portion has a plurality of slots extending in a circumferential direction about the axis of the bottom bracket. The slots are arranged around the central opening.

In a preferred embodiment, the mounting device further includes a connecting portion that is adjustably connected to the mounting portion and is adapted to be attached to the front derailleur. Preferably, one of the connecting portion and the mounting portion includes an elongated adjustment slot therein and the other of the connecting portion and the mounting portion includes a corresponding adjustment opening therein. A threaded fastener extends through the adjustment slot and the adjustment opening and can translate within the adjustment slot to provide adjustment between the mounting portion and the connecting portion.

In accordance with another aspect of the present invention there is provided a bicycle front derailleur that includes a chain guide comprising an inner plate and outer plate that is spaced apart from the inner plate, and an indicator that is disposed on at least one of the inner plate and the outer plate and configured to indicate an orientation of the chain guide relative to a predetermined direction. Preferably, the indicator is disposed on the outer surface of the outer plate.

In accordance with yet another aspect of the present invention there is provided a bicycle front derailleur assembly that includes a bicycle front derailleur and a mounting device for mounting the bicycle front derailleur to a bicycle frame. The mounting device includes a mounting portion that is adapted to be adjustably mounted around an axis of a bottom bracket of the bicycle frame, and an indicator configured to indicate an orientation of the front derailleur assembly relative to a predetermined direction. The indicator is disposed on at least one of the bicycle front derailleur and the mounting portion.

The invention, together with additional features and advantages thereof, may be best understood by reference to the following description.

BRIEF DESCRIPTION OF THE DRAWINGS

Like numerals refer to like parts throughout the several views of the drawings.

DETAILED DESCRIPTION OF THE PREFERRED EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position.

Figure 1:
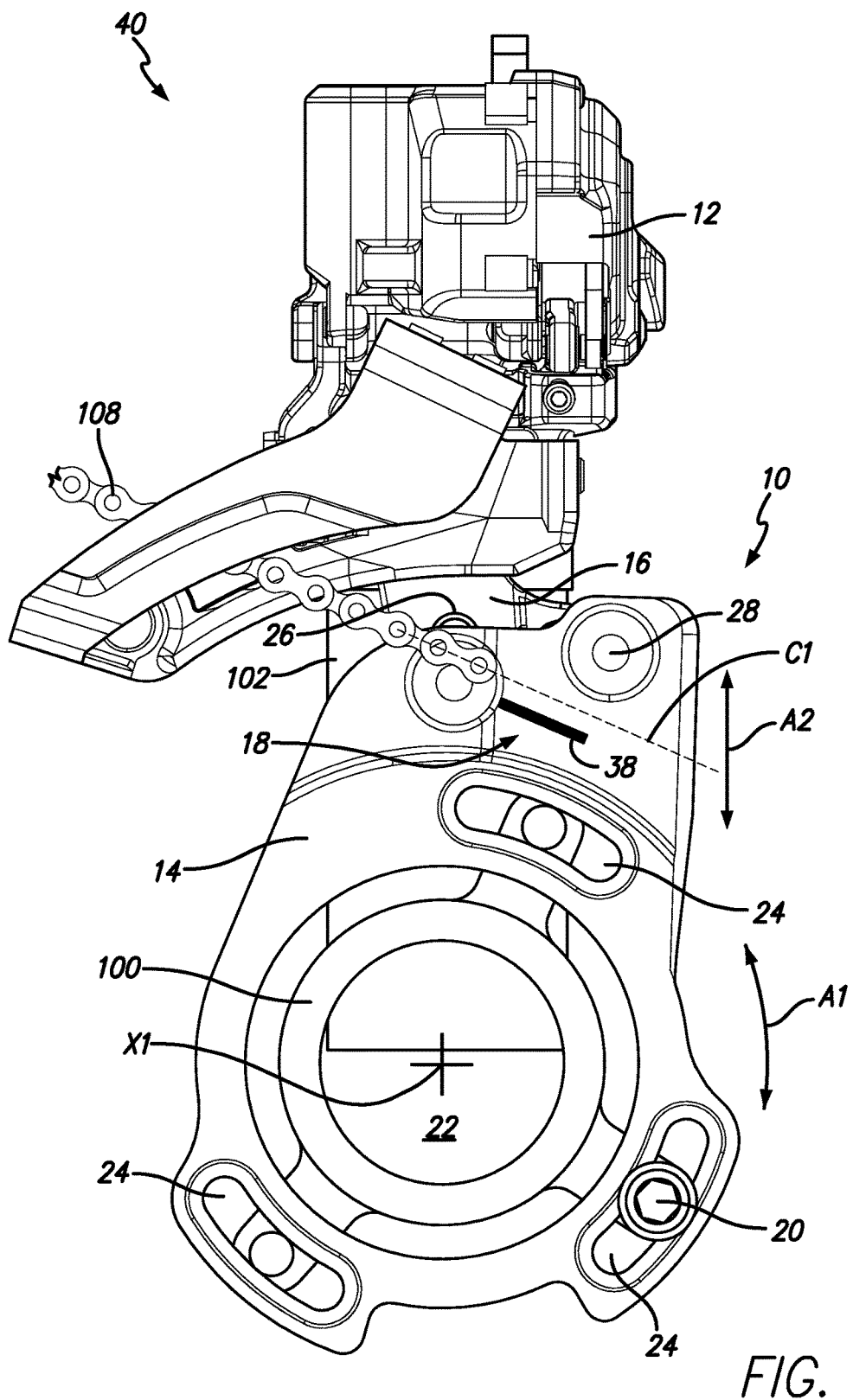
FIG. 1 is a side elevational view of a mounting device and front derailleur mounted on a bicycle frame in accordance with a preferred embodiment of the present invention.

Referring to FIGS. 1-7 a mounting device 10 for a bicycle front derailleur 12 is shown and described. The mounting device 10 generally comprises a mounting portion 14, a connecting portion 16 and an indicator 18 that is configured to indicate an orientation of the mounting portion 14 relative to a predetermined direction. In a preferred embodiment, the mounting portion 14 is adapted to be adjustably mounted such that it is positioned around an axis X1 that is defined by a bottom bracket 100 of a bicycle frame 102. As shown in FIG. 1, in a preferred embodiment, the mounting portion 14 is connected directly to the bottom bracket 100 by threaded fasteners 20. However, this is not a limitation on the present invention and in another embodiment, the mounting portion 14 can be connected to another portion of the bicycle frame 102 as long as the mounting portion 14 is positioned about the axis X1 defined by the bottom bracket 100.

In a preferred embodiment, the mounting portion 14 includes a central opening 22 and at least one and preferably a plurality of slots 24 extending in a circumferential direction about the central opening 22 and about the axis X1 of the bottom bracket 100 when the mounting device 10 is connected to the bicycle frame 102. The slots 24, in connection with threaded fasteners 20 provide adjustability in a circumferential direction about axis X1 (see arrow A1 in FIG. 1). It will be understood that for illustrative purposes only a single threaded fastener 20 is shown in FIG. 1, but that in use the other two slots 24 in FIG. 1 would include threaded fasteners 20 therein.

Figure 2:
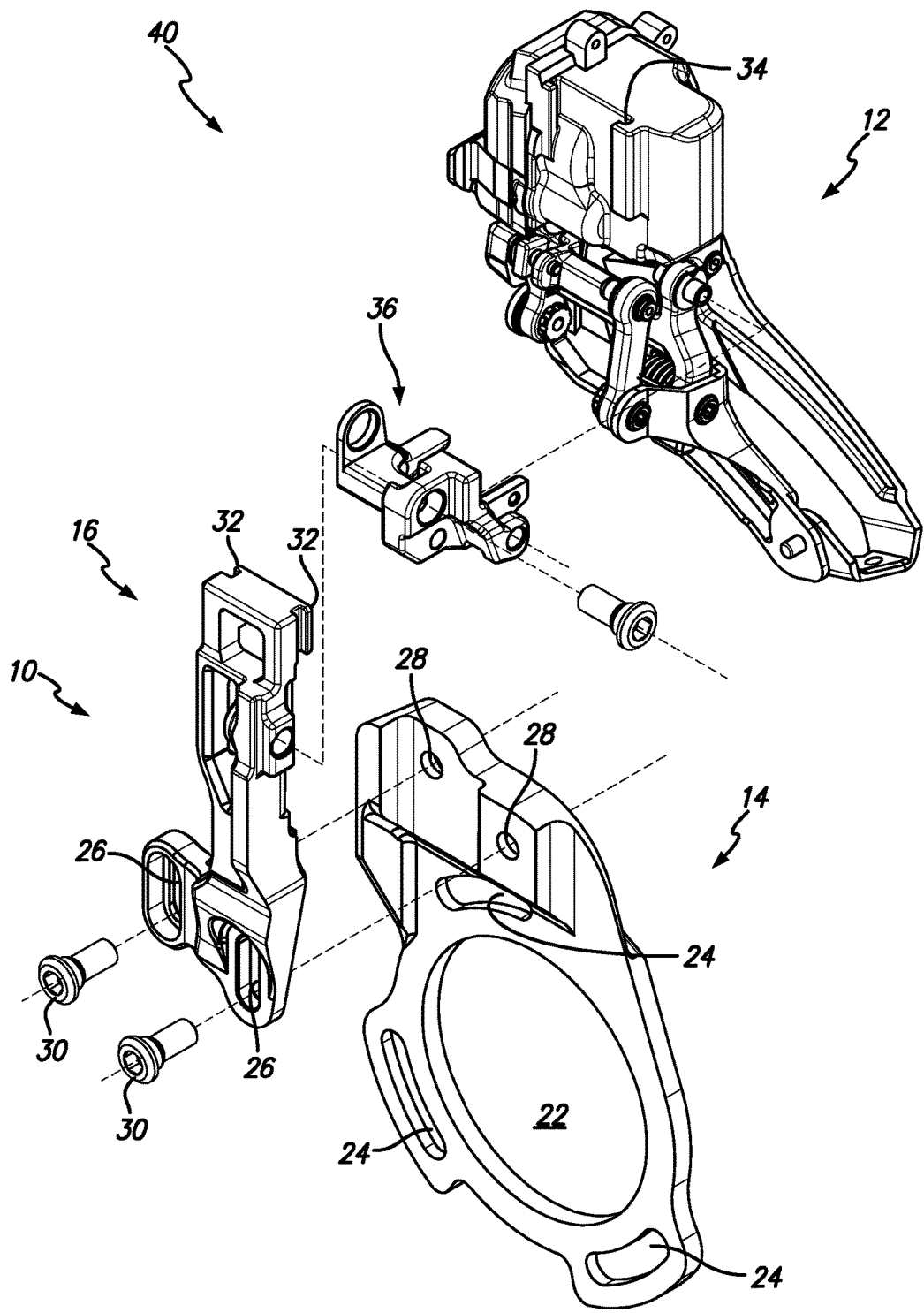
FIG. 2 is an exploded perspective view of the mounting device and front derailleur of FIG. 1.

As is shown in FIGS. 1-2, the connecting portion 16 extends between the mounting portion 14 and the front derailleur 12. In a preferred embodiment, the connecting portion 16 is adjustably connected to the mounting portion 14 via at least one adjustment slot 26 and at least one corresponding adjustment opening 28 through which extends at least one threaded fastener 30 or the like. The drawings show the adjustment slots 26 in the connecting portion 16 and the adjustment openings 28 in the mounting portion 14. However, this relationship can be reversed such that the adjustment slots 26 are in the mounting portion 14 and the adjustment openings 28 are in the connecting portion 16. The threaded fastener 30 extends through the adjustment slot 26 and the adjustment opening 28 and can translate within the adjustment slot 26 to provide adjustment of the relative position between the mounting portion 14 and the connecting portion 16 in the extending direction of the adjustment slot 26, as shown by arrow A2 in FIG. 1. In use, to adjust the position of the front derailleur 12, the threaded fasteners 30 are loosened, the connecting portion 16 and front derailleur 12 are moved vertically, and the threaded fasteners 30 are tightened. It will be appreciated that more or less adjustment slots and openings can be provided. Furthermore, the threaded fasteners can be replaced by other components that provide adjustability between the mounting portion 14 and the connecting portion 16.

Figure 4:
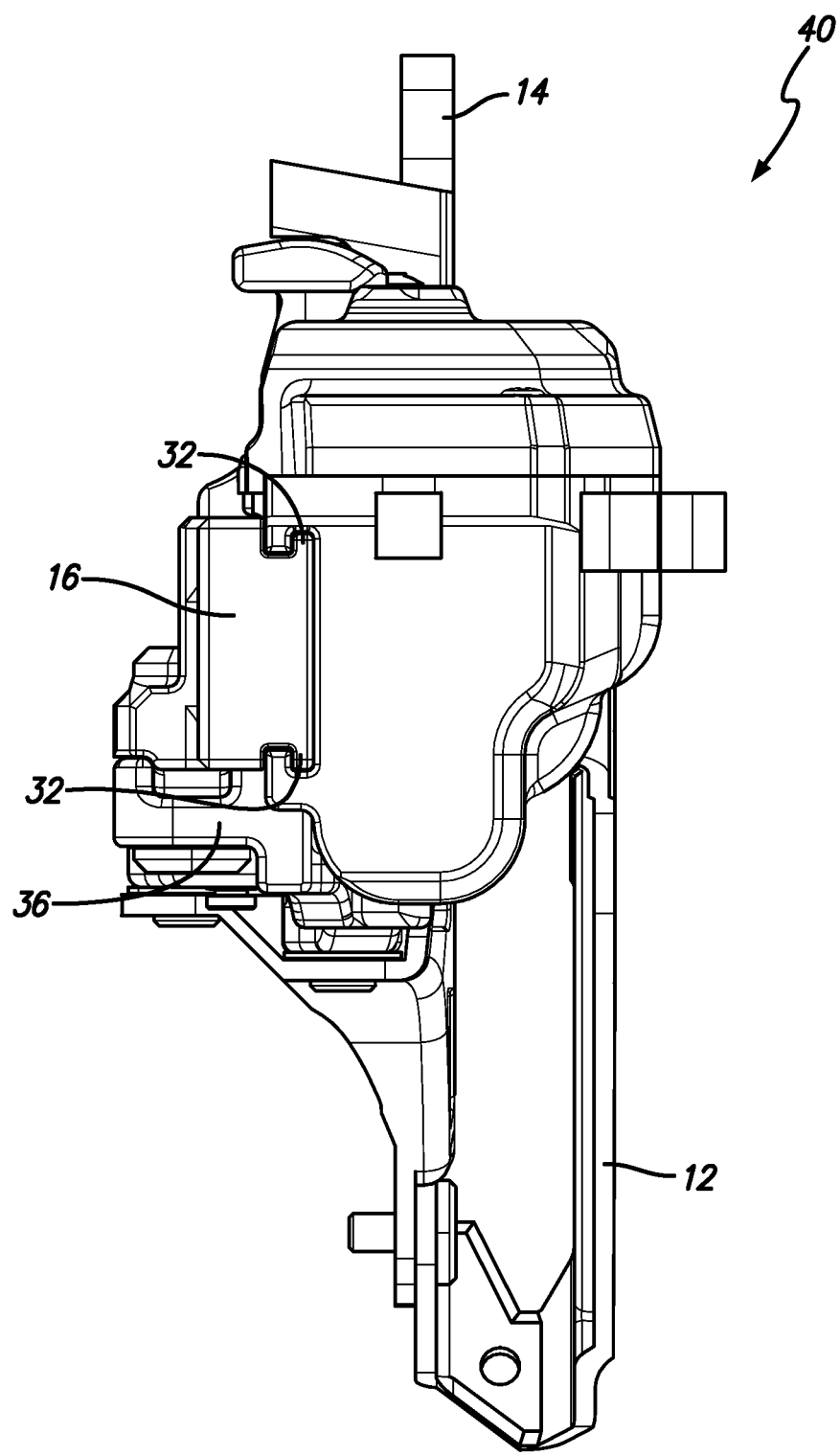
FIG. 4 is a top plan view of the mounting device and front derailleur of FIG. 1.
Figure 5:
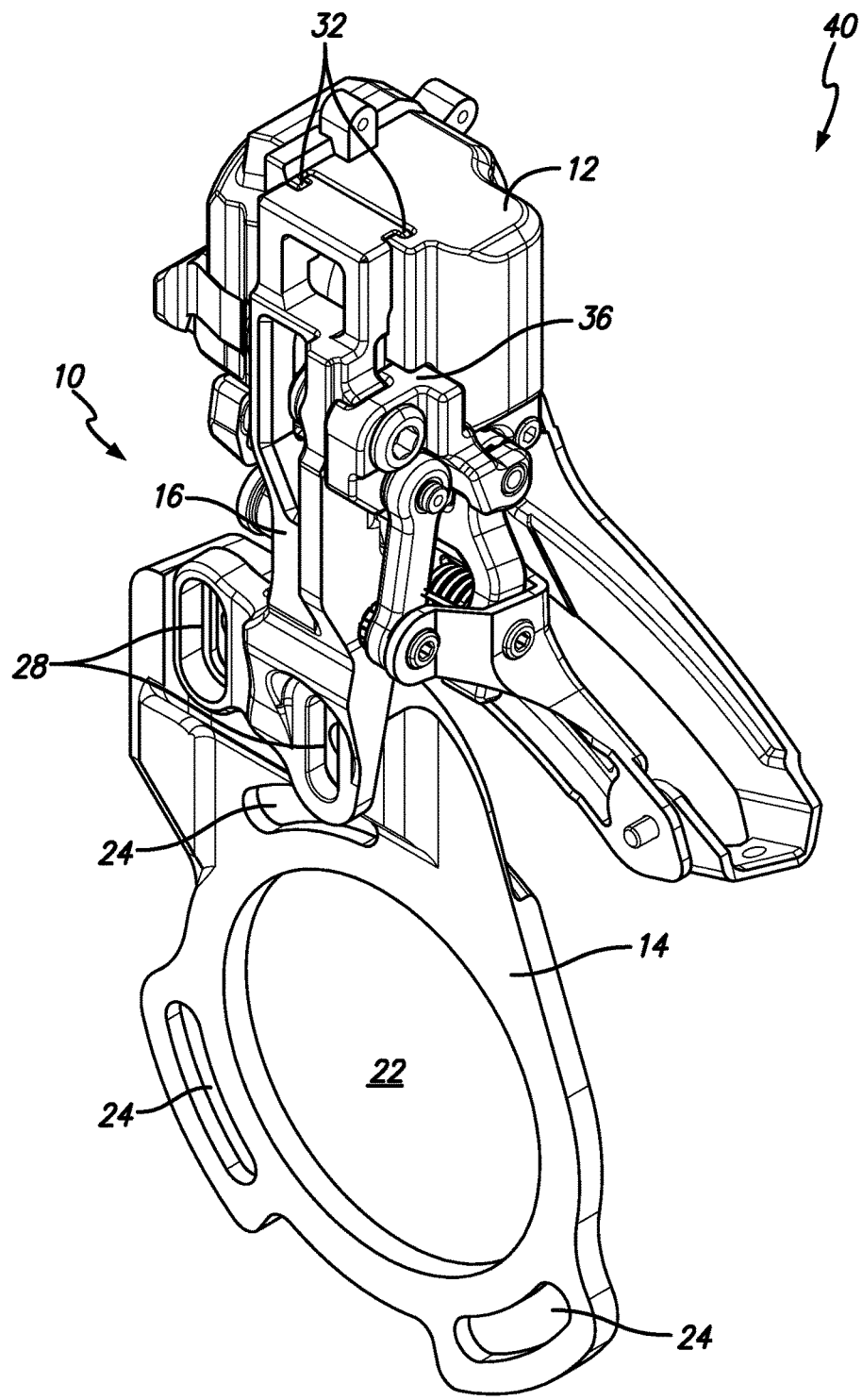
FIG. 5 is an inside perspective view of the mounting device and front derailleur of FIG. 1.

As is best shown in FIGS. 2 and 4, in a preferred embodiment, the connecting portion 16 includes fins 32 that extend above adjustment slots 26 and are received in corresponding channels 34 in the front derailleur 12. The mounting device 10 also includes a bracket 36 that helps secure the mounting portion 14, the connecting portion 16 and the front derailleur 12 and maintains the fins 32 within the channels 34. In another embodiment, the fins can be on the front derailleur and the channels can be defined in the connecting portion 16.

Figure 6:
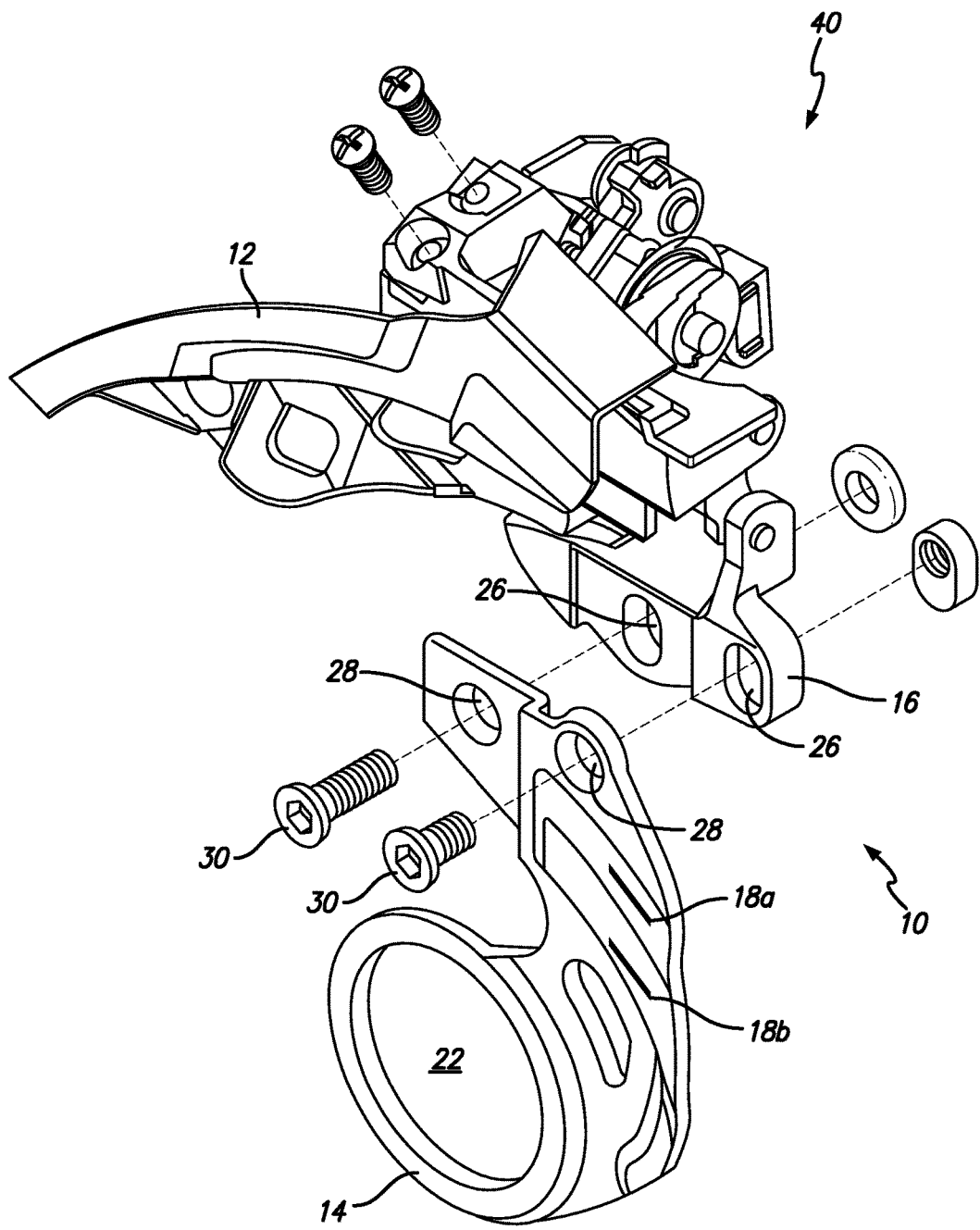
FIG. 6 is an exploded perspective view of a mounting device and front derailleur in accordance with another preferred embodiment of the present invention.
Figure 7:
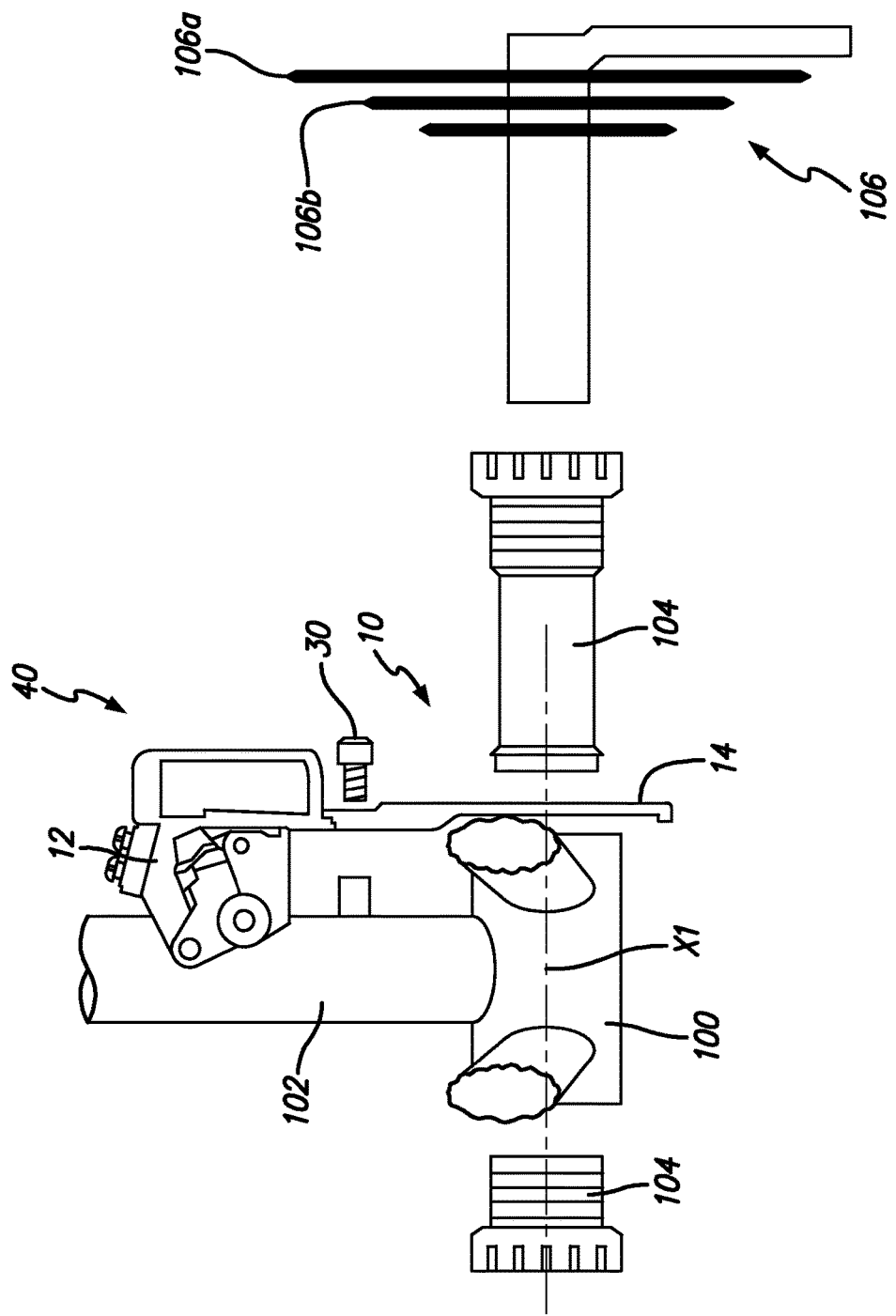
FIG. 7 is an exploded schematic view of the mounting device and front derailleur of FIG. 6 together with a portion of a bicycle frame.

FIGS. 6-7 show another embodiment of the present invention where the circumferential slots 24 are omitted and the mounting portion 14 is secured to the bottom bracket 100 by an adapter 104. As shown, the adapter 104 positions the mounting portion 14 between the bottom bracket 100 and the chain rings 106. To adjust the position of the mounting portion 14 (and the front derailleur 12) in the circumferential direction the adapter 104 is loosened, the mounting portion 14 is rotated around axis X1 and the adapter 104 is retightened. As shown in FIG. 6, in this embodiment, the adjustment slots 26 are defined in the connecting portion 16 and the adjustment openings 28 are defined in the mounting portion 14. Once again, this relationship can be reversed.

The indicator 18 will now be described. As described above in the Background of the Invention section, it is important that the front derailleur 12 is positioned such that the chain 108 extends therethrough in a predetermined direction. Generally, the indicator 18 helps a user position the front derailleur such that it is adjusted to the desired orientation with respect to the chain 108 or the chain line C1 (the line defined by the running direction of the chain 108). Therefore, in a preferred embodiment, the predetermined direction corresponds to the direction of the chain line C1. In another preferred embodiment, the indicator 18 is configured to indicate a circumferential position of the mounting portion 14 around the axis X1 of the bottom bracket 100. It will be appreciated that the chain line C1 is defined by the running direction of the chain 108 when engaged with a chain ring 106.

The indicator 18 can be a marking, notch, protrusion or the like. In a preferred embodiment, as shown in FIG. 1, the indicator 18 is a directional mark 38 which is configured to be approximately parallel to the predetermined direction, i.e., the chain line C1. A directional mark 38 is defined herein as any marking that defines a line or curve with a length. For example, the directional mark 38 can be a solid line (as shown in FIG. 1), a dashed line, a plurality of dots that form a line, a scratch, indentation, protrusion or the like.

As shown in FIG. 6, in a preferred embodiment, the mounting device 10 includes first and second indicators 18a and 18b; one for indicating an orientation of the mounting portion 14 relative to the chain line of the chain 108 when it is positioned on a first chain ring 106a and the other for indicating an orientation of the mounting portion 14 relative to the chain line of the chain 108 when it is positioned on a second chain ring 106b. In this embodiment, the indicators 18a and 18b comprise two different lines that are configured to be parallel to the chain line of the chain 108 when it is engaged with chain ring 106a or chain ring 106b, respectively. In another embodiment, a single indicator can include two lines or marks (top and bottom) in between which the chain line of the chain 108 can be located.

Figure 3A:
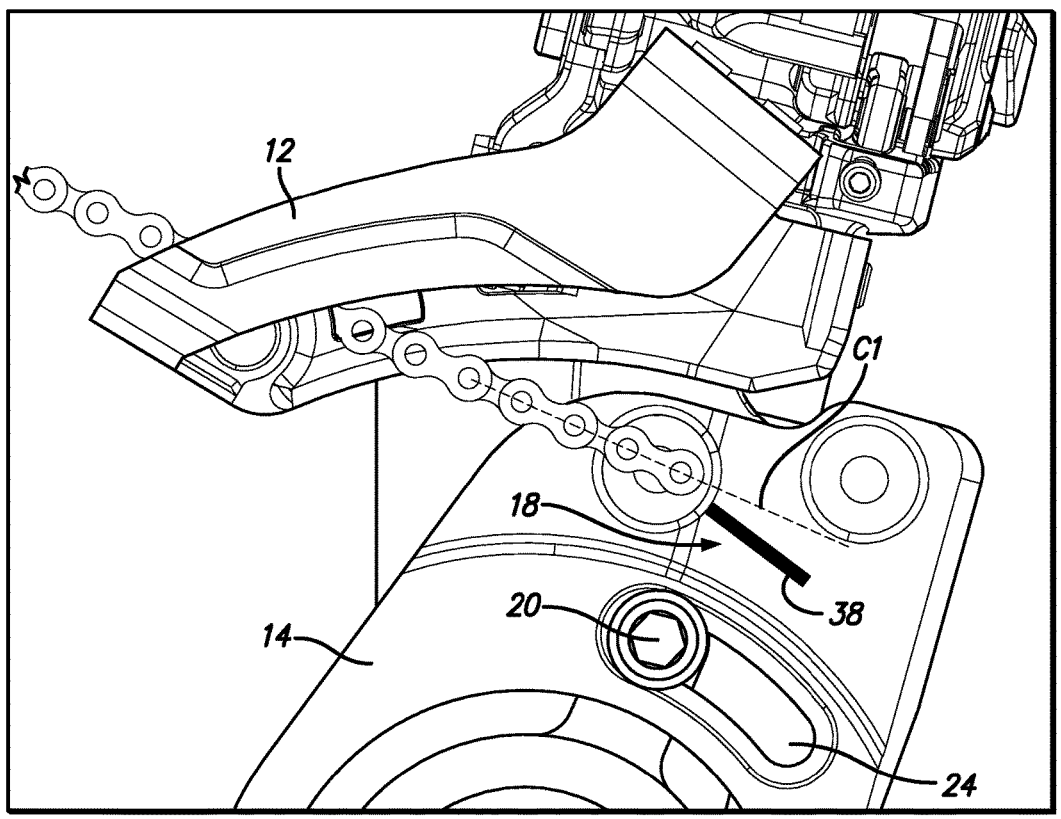
FIG. 3A is a portion of the mounting device and front derailleur of FIG. 1 showing the chain line not aligned with the indicator.
Figure 3B:
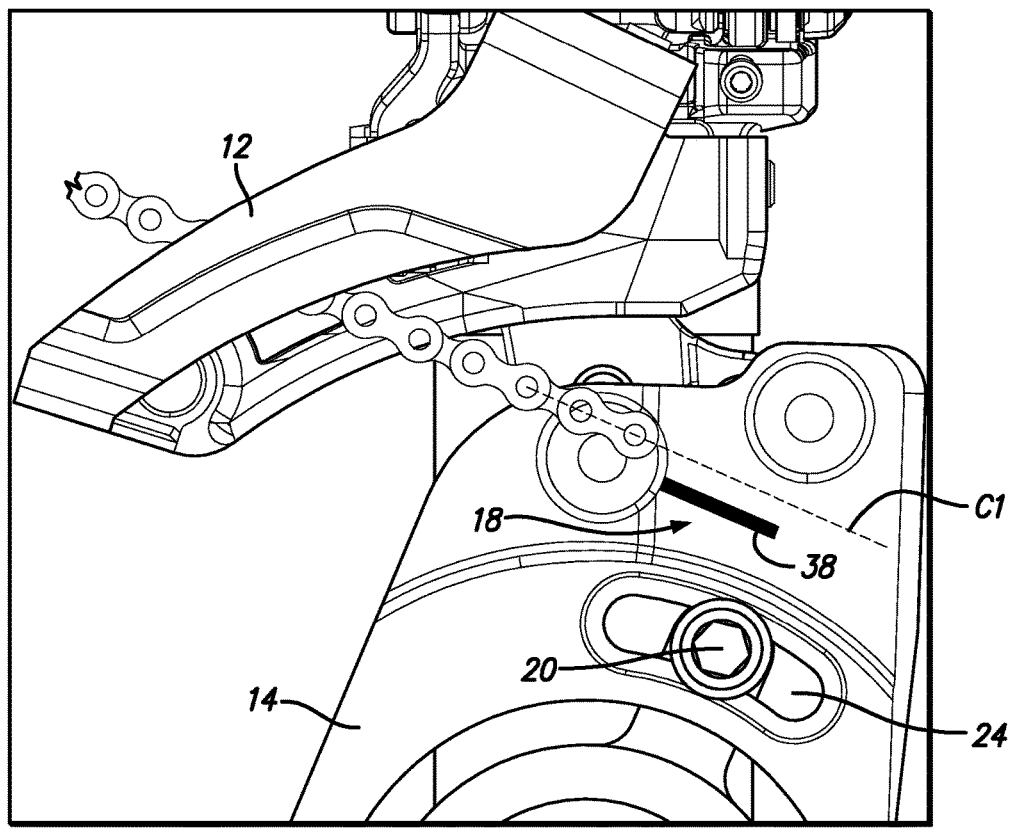
FIG. 3B is a portion of the mounting device and front derailleur of FIG. 1 showing the chain line aligned with the indicator.

FIGS. 3A-3B show an example of positioning the front derailleur 12 and mounting portion 14 using the indicator 18. As shown in FIG. 3A, the chain line C1 is not parallel to the indicator 18/directional mark 38. To adjust the position of the front derailleur 12 and mounting portion 14 in the circumferential direction, the threaded fasteners 20 are loosened and the mounting portion 14 is rotated such that the indicator 18/directional mark 38 is parallel to the chain line C1. The threaded fasteners 20 are then retightened. If desired or necessary, the vertical position of the front derailleur 12 can also be adjusted via the connection between the connecting portion 16 and the mounting portion 14 described above.

It will be appreciated that the mounting device 10 and front derailleur 12 can be provided to a user as a complete assembly (referred to herein as a front derailleur assembly 40). The present invention also includes a method of adjusting the position of the front derailleur 12 with respect to the chain line C1. The method includes mounting the front derailleur assembly such that the mounting portion 14 is positioned around the bottom bracket 100 axis X1, determining the position of the chain line, rotating the mounting portion, and aligning the indicator with the chain line. The method can also include vertical movement of the front derailleur 12.

Figure 8:
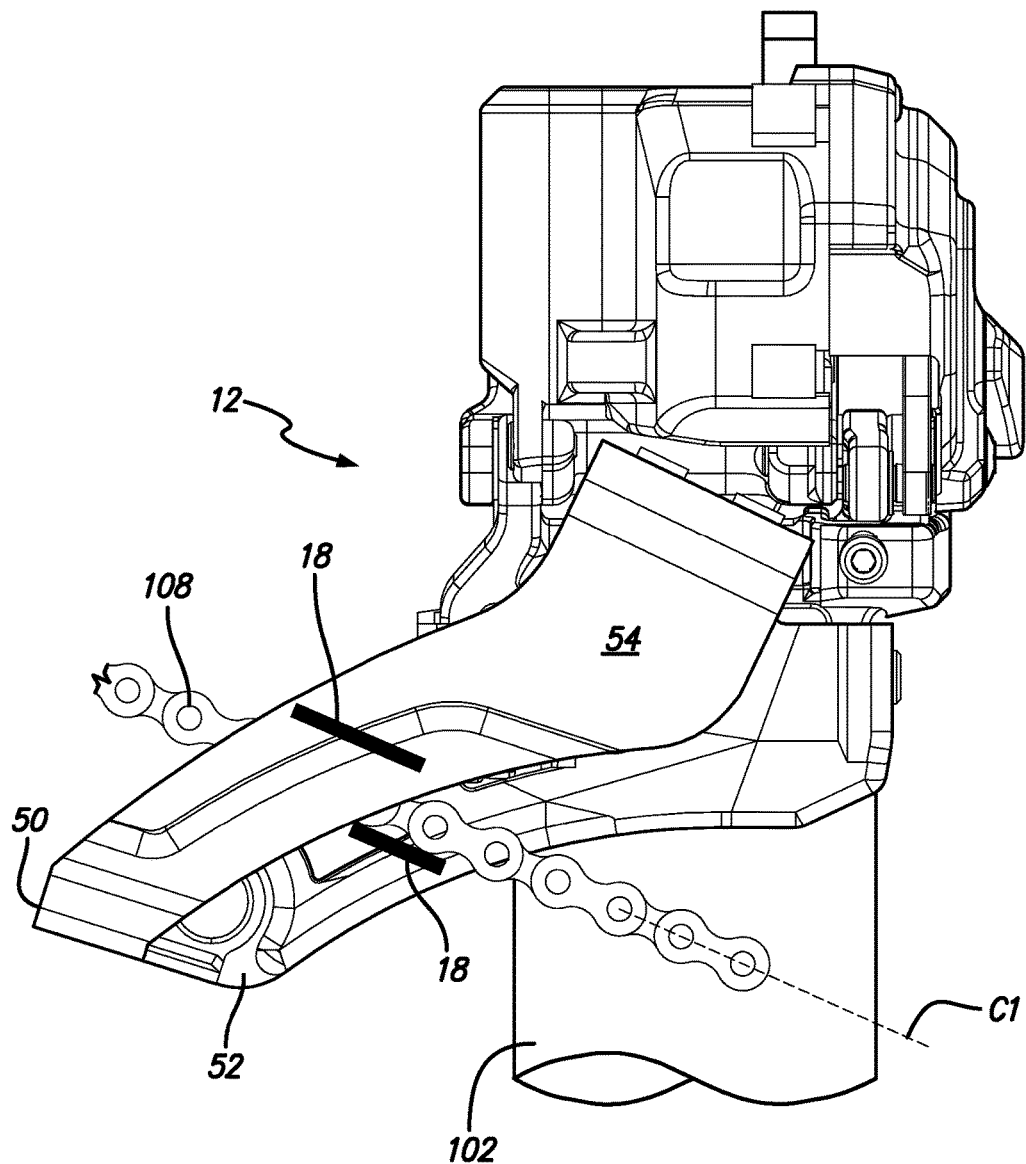
FIG. 8 is a side elevational view of a front derailleur in accordance with another preferred embodiment of the present invention.

FIG. 8 shows another embodiment of the present invention where the indicator 18 is disposed on the front derailleur 12. In this embodiment, the front derailleur generally includes a chain guide 50 comprising an inner plate 52 (that is closer to the bicycle frame 102) and outer plate 54 that is spaced apart from the inner plate 52, and the indicator 18, which is disposed on at least one of the inner plate 52 and the outer plate 54. FIG. 8 shows the indicator positioned on both the inner plate 52 and the outer plate 54. However, this is not a limitation on the present invention and the indicator can be positioned on just the inner plate 52 or just the outer plate 54. Furthermore, the indicator 18 can be positioned on either or both of the inner and outer surfaces of the inner and/or outer plates 52 and 54.

In another embodiment, both the front derailleur 12 (on one or both of the inner and outer plates 52 and 54) and the mounting portion 14 can include indicators 18. In another embodiment, the connecting portion 16 can be omitted and the mounting portion 14 can be connected directly to the front derailleur 12 without any vertical adjustability.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including," "having" and their derivatives. The term "mounted" or "mounting," as used herein, encompasses configurations in which an element directly secured to another element by affixing the element is directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "attached", "bonded", "fixed" and their derivatives. Also, the terms "part," "section," "portion," "member" or "element" when used in the singular can have the dual meaning of a single part or a plurality of parts. As used herein to describe the above embodiment(s), the following directional terms "forward," "rearward," "rightward," "leftward," "outward," "inward," "downward," "upward," "above," "below," "vertical," "horizontal," and "transverse" as well as any other similar directional terms refer to those directions of a bicycle equipped with the mounting device. Accordingly, these terms, as utilized to describe the mounting device should be interpreted relative to a bicycle equipped with the mounting device as used in the normal riding position on a level surface. Finally, terms of degree such as "substantially," "about" and "approximately" as used herein mean a reasonable amount of deviation of the modified term such that the end result is not significantly changed.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for"). Accordingly, the applicant reserves the right to add additional claims after filing the application to pursue such additional claim forms for other aspects of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A mounting device for mounting a front derailleur to a bicycle frame, the mounting device comprising:
   a mounting portion that is adapted to be adjustably mounted such that it is positioned around an axis that is defined by a bottom bracket of the bicycle frame, wherein the mounting portion has at least one slot extending in a circumferential direction about the axis of the bottom bracket such that the mounting portion is rotationally adjustable with respect to the bottom bracket, and
   an indicator configured to indicate an orientation of the mounting portion relative to a predetermined direction.

2. The mounting device of claim 1, wherein the predetermined direction corresponds to a chain line which is defined by a running direction of a bicycle chain.

3. The mounting device of claim 2, wherein the chain line is defined by the running direction of the bicycle chain when the bicycle chain is engaged with a chain ring.

4. The mounting device of claim 3 wherein the indicator includes at least first and second indicators that are positioned such that when the mounting device is adjustably mounted around the axis of the bottom bracket the first indicator will indicate an orientation of the mounting portion relative to a first direction corresponding to a first chain line defined by a first chain ring and the second indicator will indicate an orientation of the mounting portion relative to a second direction corresponding to a second chain line defined by a second chain ring.

5. The mounting device of claim 1, wherein the indicator is configured to indicate a circumferential position of the mounting portion around the axis of the bottom bracket.

6. The mounting device of claim 1, wherein the indicator comprises a directional mark which is configured to be parallel to the predetermined direction.

7. The mounting device of claim 1, wherein the mounting portion includes a central opening defined therein that is axially aligned with the axis of the bottom bracket when the mounting part is mounted around the axis of the bottom bracket, wherein the mounting portion has a plurality of slots extending in a circumferential direction about the axis of the bottom bracket, and wherein the slots are arranged around the central opening.

8. The mounting device of claim 1 further comprising a connecting portion that is adjustably connected to the mounting portion and is adapted to be attached to the front derailleur.

9. The mounting device of claim 8 wherein one of the connecting portion and the mounting portion includes an elongated adjustment slot therein and the other of the connecting portion and the mounting portion includes a corresponding adjustment opening therein, and wherein a threaded fastener extends through the adjustment slot and the adjustment opening and can translate within the adjustment slot to provide adjustment between the mounting portion and the connecting portion.

10. The mounting device of claim 8 wherein the connecting portion includes one of fins or channels that are adapted to be adjustably received in the other of corresponding fins or channels in the front derailleur.

11. The mounting device of claim 10 wherein the fins are included on the connecting portion and are adapted to be adjustably received in the channels in the front derailleur.

12. The mounting device of claim 8 wherein one of the connecting portion and the mounting portion includes first and second elongated adjustment slots therein and the other of the connecting portion and the mounting portion includes first and second corresponding adjustment openings therein, and wherein first and second threaded fasteners extend through the first and second adjustment slots and the first and second adjustment openings, respectively, and can translate within the first and second adjustment slots to provide adjustment between the mounting portion and the connecting portion, wherein the first and second elongated adjustment slots or the first and second adjustment openings that are defined in the connecting portion are offset from one another, and wherein the corresponding first and second elongated adjustment slots or the first and second adjustment openings that are defined in the mounting portion are offset from one another.

13. The mounting device of claim 1 wherein the mounting portion is rotationally adjustable between at least a first position and a second position, wherein the indicator is located on the mounting portion, wherein the indicator is a directional mark that is configured to be parallel to a chain line when the mounting portion is in the second position, and wherein the chain line is defined by the running direction of the bicycle chain when the bicycle chain is engaged with a chain ring.

14. A mounting device for mounting a front derailleur to a bicycle frame, the mounting device comprising:
a mounting portion that is adapted to be mounted such that it is positioned around an axis that is defined by a bottom bracket of the bicycle frame, wherein the mounting portion has at least one arcuate slot extending in a circumferential direction about the axis of the bottom bracket such that the mounting portion is rotationally adjustable with respect to the bottom bracket between at least a first position and a second position, and
an indicator located on the mounting portion, wherein the indicator is a directional mark that is configured to be parallel to a chain line when the mounting portion is in the second position, and wherein the chain line is defined by the running direction of the bicycle chain when the bicycle chain is engaged with a chain ring.

15. The mounting device of claim 14 further comprising a connecting portion that is adjustably connected to the mounting portion and is adapted to be attached to the front derailleur, wherein one of the connecting portion and the mounting portion includes an elongated adjustment slot therein and the other of the connecting portion and the mounting portion includes a corresponding adjustment opening therein, and wherein a threaded fastener extends through the adjustment slot and the adjustment opening and can translate within the adjustment slot to provide adjustment between the mounting portion and the connecting portion.

* * * * *